Nov. 21, 1950 H. A. STAMPER 2,530,739

STYLUS HOLDER

Filed March 12, 1948

INVENTOR

H. A. STAMPER

BY E. H. Woodbury

ATTORNEY

Patented Nov. 21, 1950 2,530,739

UNITED STATES PATENT OFFICE 2,530,739

STYLUS HOLDER

Hamilton Alan Stamper, Los Angeles, Calif., assignor to Bendix Aviation Corporation, South Bend, Ind., a corporation of Delaware Application March 12, 1948, Serial No. 14,591

6 Claims. (Cl. 346—139)

This invention relates to electrical recording instruments of the type employing a spring wire stylus.

One recorder of this type employs a sensitive paper that turns black in response to an electrical discharge, and the paper is drawn across or mounted on a conductive surface to which an electrical impulse to be recorded is transmitted through the paper from the stylus.

The electric discharges from the end of the stylus often heat it sufficiently to draw the temper and permit it to take a bend. This necessitated frequent adjustments to maintain proper contact with the paper. With the prior known stylus holders, the adjustment often rotated the bent stylus thereby throwing it out of its proper path on the paper.

An object of this invention is to provide a stylus holder that makes frequent extension of the stylus unnecessary, and that does not rotate the stylus during extension.

Another object is to provide a stylus holder that is simple and inexpensive, in addition to having superior utility.

Other more specific objects and features of the invention will appear from the description to follow.

Briefly, the stylus holder of the invention consists of a metal plate having portions thereof folded back to support the stylus wire in a desired path of longitudinal movement, with a clamping screw for adjustably locking the stylus in desired position of longitudinal adjustment. The arrangement permits projection of a substantial length of stylus wire beyond the holder, but limits the extent of flexing movement of the wire, so that frequent adjustment is unnecessary. Furthermore, the mechanism for clamping the wire has no tendency to rotate the wire, so that misalignment does not occur as a result of adjustment even though the end of the wire may have become bent during previous operation. However, with the new construction, the tendency for the wire to be bent is reduced because of the greater length of the wire between the holder and the record paper so that the bending strain applied to the wire is ordinarily insufficient to bend it even though it may have been considerably weakened by heat.

A complete understanding of the invention may be had from the following detailed description, with reference to the drawing, in which.

Figure 1:
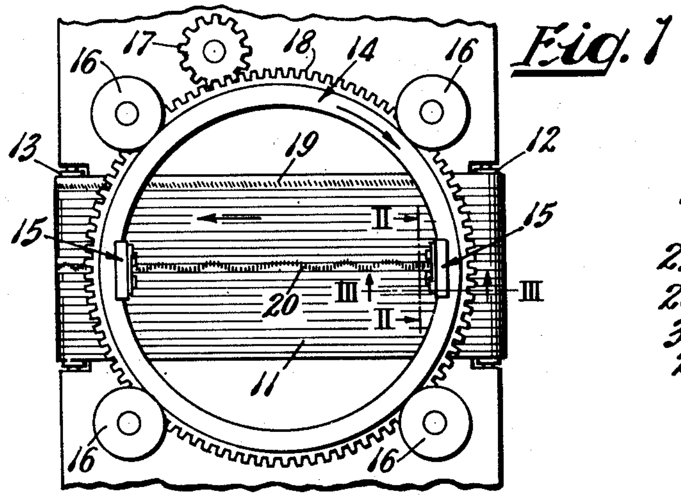
Fig. 1 is a front elevation view showing a portion of a depth recorder incorporating a stylus holder in accordance with the invention.

Referring to Fig. 1, there is shown a portion of a depth recorder of the sonic type for measuring water depth, utilizing supersonic waves reflected from the bottom. The recorder comprises an electrically conductive wall 10 (Fig. 2) over which a paper record tape 11 of known type is drawn, this tape being unwound from a spool 12 and wound onto a spool 13, as indicated by the arrow in Fig. 1. Mounted in front of the paper tape 11 is a rotatable ring 14 which carries one or two stylus assemblies 15. In Fig. 1, two of the stylus assemblies are shown mounted at diametrically opposite points on the ring 14, but the number of assemblies employed has nothing to do with the present invention. The ring 14 is supported for rotation by four idler wheels 16 so that the space within the ring is unobstructed. The ring is rotated by any suitable driving mechanism through a driving pinion 17 which meshes with the gear 18 on the ring 14. In operation, the ring 14 is rotated at a constant speed synchronized with the transmission of impulses into the water, so that as each stylus on the ring 14 passes over the upper edge of the paper tape 11 an impulse is transmitted into the water and is simultaneously applied to the stylus so as to record near the upper margin of the tape 11 a line 19. Actually, this line 19 consists of a series of short arcuate marks, but the marks can be so close together, by properly choosing the speed of the paper tape 11, that a continuous line is formed. The circuit of the depth recorder is such that the echo of the transmitting impulse is amplified and applied to the stylus, and the speed of the ring 14 is so chosen that the stylus is still moving over the tape 11 at the time the echo impulse is received. The received impulses therefore produce a line 20 on the tape 11, the distance of which line from the line 19 is a measure of the depth of the water. The present invention, as previously indicated, resides in a stylus holder, and is not limited to any particular field of operation, such as depth recording, the illustration being chosen at random.

Figure 2:
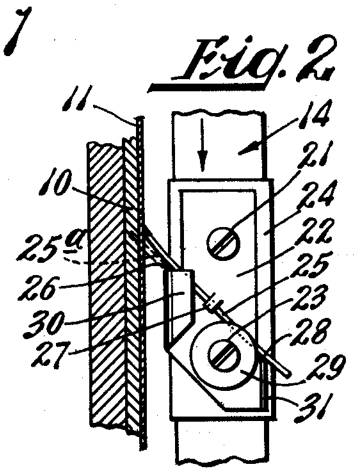
Fig. 2 is a detail side elevation view partly in section, taken in the plane II—II of Fig. 1, and showing the stylus holder in elevation.
Figure 3:
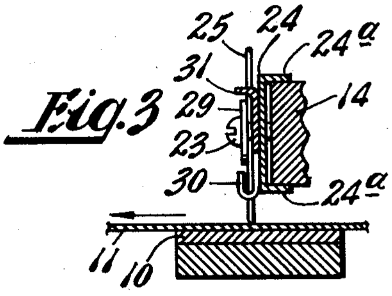
Fig. 3 is a detail section taken in the horizontal plane III—III of Fig. 1.

Each of the stylus assemblies 15 is more fully illustrated in Figs. 2 and 3. It comprises a sheet metal plate member 22 secured to the ring 14 by a pair of screws 21 and 23. Since the plate member 22 is flat, whereas the inner surface of the ring 14 is cylindrically curved, it is desirable to provide a base for the plate member 22. Such a base may consist of a channel member 24, the flanges 24a (Fig. 3) of which engage the front and rear surfaces respectively of the ring 14. The screws 21 and 23 extend through holes in the plate member 22 and the base 24 and thread into the ring 14.

The stylus itself consists of a piece of spring wire 25. When the free end of the stylus is clear of the paper tape 11, as indicated in dotted lines at 25a, it is supported by a first shoulder 26, a second shoulder 27, and a third shoulder 28, and is clamped against longitudinal movement by a washer 29 which is positioned under the head of the screw 23. The three shoulders 26, 27 and 28 are preferably substantially in alignment so that a relatively small force applied to the end of the stylus is sufficient to deflect it away from the shoulder 26, which deflection is caused by the paper tape 11, as shown in full lines in Fig. 2.

To guide the free end of the stylus and limit lateral movement thereof, a guide lip 30 is provided by folding over an edge portion of the plate member 22, this lip portion being spaced from the juxtaposed outer surface of the plate member a distance slightly greater than the diameter of the spring wire, so as to permit free flexing of the latter between the positions shown in the dotted and full lines, respectively, in Fig. 2. The shoulder 28 may be formed by turning up a flange 31 on the edge of the plate member 22 most remote from the paper tape 11, one end edge of this flange constituting the shoulder 28.

It will be observed that the stylus holder, as shown in Figs. 2 and 3, is such that the stylus can consist merely of a straight piece of spring wire, and adjustment for wear can be readily effected by simply loosening the screw 23 and sliding the wire longitudinally past the shoulders 26, 27 and 28 to desired extent.

The shoulder 27 may consist of a tongue pressed out of the plate member 22 so that it not only provides a shoulder for restraining the stylus wire against movement in a direction parallel to the plate 22, but also away from the plate. This facilitates adjustment, because the stylus wire 25 can be moved into desired position and it will retain that position while the screw 23 is being tightened.

Figure 4:
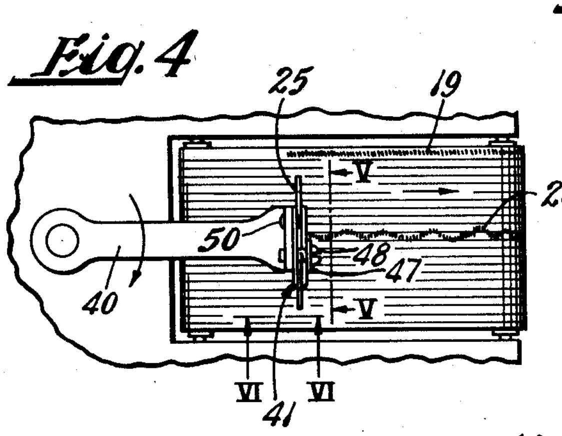
Fig. 4 is a front elevation view similar to Fig. 1 but showing a different type of recorder employing a stylus holder that is a modification of that shown in Figs. 1, 2 and 3.

The recorder illustrated in Fig. 4 differs from that of Fig. 1 in that, in place of the rotating ring 14 of Fig. 1, a rotating arm 40 is provided, and the stylus assembly is mounted on the outer end of the arm 40.

Figure 5:
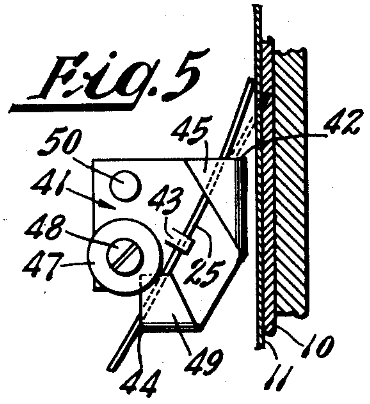
Fig. 5 is a vertical section taken in the plane V—V of Fig. 4 and showing the stylus holder in elevation.
Figure 6:
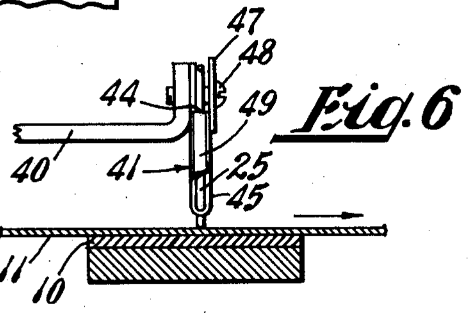
Fig. 6 is a horizontal section taken in the plane VI—VI of Fig. 4.

Referring to Figs. 5 and 6, the stylus holder comprises a plate member 41 which is somewhat smaller than the plate member 22, but is of generally similar construction, having a first shoulder 42, a second shoulder 43, and a third shoulder 44. As in the first modification, the shoulder 42 is provided by folding back a portion of the plate member 41 to provide a guide lip 45. The third shoulder 44 is also provided by folding back a portion of the plate member to form a guide lip 49 and a corner of this guide lip 49 extends under the washer 47 of the screw 48 that clamps the stylus. Thus, the washer presses the lip 49 against the stylus to hold it, instead of pressing directly against the stylus, as in the modification in Fig. 2. In Fig. 5, only one screw 48 is provided, the plate member 41 being permanently secured to the end of the arm 40 by a rivet 50. The stylus holder construction of Figs. 4, 5 and 6 is somewhat lighter than shown in Figs. 1, 2 and 3, and is more suitable for the lighter arm construction shown in Fig. 4.

Although for the purpose of explaining the invention certain embodiments thereof have been described in detail it will be apparent that various modifications can be made from the specific structure shown without departing from the invention and the latter is to be limited only to the extent set forth in the appended claims.

I claim:

1. A stylus holder for supporting a spring wire stylus comprising: a plate member having a substantially flat surface for the stylus to lie against, said plate member being adapted to be supported for movement substantially in the plane of said flat surface past a recording surface perpendicular to said plane; a first shoulder member extending from said surface adjacent the edge thereof that is nearest said recording surface; a second shoulder member extending from said surface intermediate the edges thereof; and a third shoulder member extending from said surface adjacent an edge thereof more remote from said recording surface; said second shoulder facing in a direction opposite said first and third shoulders for normally holding a straight stylus in contact with said first and third shoulders; said shoulders being so positioned that the portion of a stylus extending beyond said first shoulder extends diagonally rearward with respect to the direction of movement and bears against and is deflected away from said first shoulder by said recording surface; and means for retaining said stylus adjacent said flat surface.

2. A stylus holder according to claim 1 in which said retaining means comprises clamping means for rigidly clamping said stylus against said surface intermediate said second and third shoulders.

3. A stylus holder according to claim 1, including a guide lip adjacent said first shoulder and extending parallel to said flat surface for limiting movement of said stylus away from said surface.

4. A stylus holder according to claim 3 in which said plate member consists of sheet metal having an edge portion thereof folded back on itself to define said guide lip.

5. A stylus holder according to claim 1 including a pair of guide lips adjacent said first and third shoulders respectively and extending parallel to said flat surface for limiting movement of said stylus away from said surface.

6. A stylus holder according to claim 5 in which said retaining means comprises a clamping screw adapted to press one of said guide lips against the stylus wire.

HAMILTON ALAN STAMPER.

REFERENCES CITED

The following references are of record in the file of this patent:

UNITED STATES PATENTS

| Number | Name | Date |
|---|---|---|
| 1,475,227 | Ferguson | Nov. 27, 1923 |
| 1,480,100 | Nelson | Jan. 8, 1924 |
| 2,292,119 | Hackenberg et al. | Aug. 4, 1942 |

FOREIGN PATENTS

| Number | Country | Date |
|---|---|---|
| 327,287 | Great Britain | Apr. 3, 1940 |